United States Patent
Kreis et al.

(10) Patent No.: US 11,492,035 B2
(45) Date of Patent: Nov. 8, 2022

(54) ELECTROMECHANICAL STEERING DRIVE SYSTEM FOR MAKING AVAILABLE STEERING ASSISTANCE FOR A STEERING SYSTEM

(71) Applicant: VOLKSWAGEN AKTIENGESELLSCHAFT, Wolfsburg (DE)

(72) Inventors: Christopher Kreis, Braunschweig (DE); Tobias Sachs, Braunschweig (DE); Sebastian Schmidt-Schäfer, Weinbergen OT Bollstedt (DE)

(73) Assignee: Volkswagen Aktiengesellschaft

( * ) Notice: Subject to any disclaimer, the term of this patent is extended or adjusted under 35 U.S.C. 154(b) by 281 days.

(21) Appl. No.: 16/760,960

(22) PCT Filed: Oct. 11, 2018

(86) PCT No.: PCT/EP2018/077667
§ 371 (c)(1),
(2) Date: May 1, 2020

(87) PCT Pub. No.: WO2019/091690
PCT Pub. Date: May 16, 2019

(65) Prior Publication Data
US 2020/0298906 A1   Sep. 24, 2020

(30) Foreign Application Priority Data
Nov. 8, 2017  (DE) ............... 10 2017 219 816.8

(51) Int. Cl.
*B62D 5/04* (2006.01)

(52) U.S. Cl.
CPC ......... *B62D 5/0463* (2013.01); *B62D 5/0403* (2013.01); *B62D 5/0493* (2013.01); *B62D 5/0484* (2013.01)

(58) Field of Classification Search
CPC ... B62D 5/0463; B62D 5/0403; B62D 5/0493
See application file for complete search history.

(56) References Cited

U.S. PATENT DOCUMENTS

| 6,208,923 B1 | 3/2001 | Hommel |
| 6,448,738 B1 * | 9/2002 | Burton ............. H02P 21/22 318/807 |

(Continued)

FOREIGN PATENT DOCUMENTS

| DE | 19834870 A1 | 2/2000 |
| DE | 10157666 A1 | 6/2003 |

(Continued)

OTHER PUBLICATIONS

Search Report for International Patent Application No. PCT/EP2018/077667; dated Feb. 13, 2019.

*Primary Examiner* — Jacob D Knutson
(74) *Attorney, Agent, or Firm* — Barnes & Thornburg, LLP (57) ABSTRACT

A steering drive system for a steering system of a transportation vehicle having a first control unit for actuating a first winding circuit of a steering drive motor with a test circuit to make available a defined changing test signal and a second control unit for actuating a second winding circuit of the steering drive motor, wherein a test signal reception circuit of the second control unit receives the test signal, and wherein the second control unit actuates the steering drive motor based on the presence or absence of the test signal.

17 Claims, 3 Drawing Sheets

(56) References Cited

U.S. PATENT DOCUMENTS

2017/0217481 A1* 8/2017 Asao .................... B62D 5/0487
2018/0281846 A1   10/2018 Schreiner

FOREIGN PATENT DOCUMENTS

| DE | 102012101006 A1 | 8/2013 |
| DE | 102015107504 A1 | 11/2016 |
| DE | 102015116937 A1 | 4/2017 |
| DE | 102016103601 A1 | 9/2017 |

* cited by examiner

ELECTROMECHANICAL STEERING DRIVE SYSTEM FOR MAKING AVAILABLE STEERING ASSISTANCE FOR A STEERING SYSTEM

PRIORITY CLAIM

This patent application is a U.S. National Phase of International Patent Application No. PCT/EP2018/077667, filed 11 Oct. 2018, which claims priority to German Patent Application No. 10 2017 219 816.8, filed 8 Nov. 2017, the disclosures of which are incorporated herein by reference in their entireties.

SUMMARY

Illustrative embodiments relate to steering systems, in particular, steering systems with an electromechanical steering drive, as well as measures for increasing the reliability of an electromechanical steering drive system.

BRIEF DESCRIPTION OF THE DRAWINGS

Disclosed embodiments are explained in greater detail hereinafter using the attached drawings, in which.

DETAILED DESCRIPTION

Steering systems in conventional transportation vehicles usually have electromechanical steering assistance which assists a driver with steering by way of steering intervention. For this purpose, steering systems of this type have a steering drive which, when correspondingly activated, introduces a steering assist force or a steering assist torque into the steering system and assists a steering movement or even performs the movement automatically.

The function of the steering system in a transportation vehicle is extremely safety critical, since even the smallest deviations of a steering movement from a steering intervention specification, in particular, in the case of higher transportation vehicle speeds, can lead to undesired transportation vehicle behavior, which can endanger transportation vehicle occupants and/or the transportation vehicle.

The existing safety concept of electromechanical steering systems makes provision for the steering assistance to be switched off if an error is identified and for the driver to continue steering the transportation vehicle without electromechanical steering assistance. However, increased safety requirements are necessary if an autonomous driving function is implemented in a steering system of this type.

It cannot be assumed that the driver can take over steering the transportation vehicle immediately after an error occurs, since the driver is distracted or possibly asleep. The steering system must therefore ensure that the autonomous driving function continues to perform for a certain period of time and the transportation vehicle is correspondingly steered, despite the presence of a malfunction or a failure of a component of the steering system.

To increase reliability, components of the steering system normally have a redundant design, so that in the event of an error a functional subsystem continues to be available by way of which at least one reduced electromechanical steering assist force can be provided. However, the number of components of the steering system in turn increases the probability of failure, such that it is desirable to provide increased reliability with as low a number of components of the steering system as possible.

An electromechanical servo-steering system with two subsystems is known from document DE 10 2012 101 006 A1, which subsystems each have a sensor, a power electronics unit and an actuator unit to provide the servo-steering system with a redundancy. An electronic control system controls the redundantly designed subsystems.

A method for operating a steering system of a transportation vehicle with a power steering system is described in document DE 10 2015 116 937 A1. The power steering system comprises a number of actuator paths which serve to introduce a total assist torque. The total assist torque and partial assist torques for each actuator path are determined in each actuator path. Each actuator path obtains its assigned partial assist torque from an actuator path which is activated as master.

A steering system which has a redundant design is known from document DE 10 2015 107 504 A1. The steering system comprises a first partial machine with a first sensor, a first analog-digital converter and a first control unit, and a second partial machine with a second sensor, a second analog-digital converter and a second control unit. A communication channel is provided between the first sensor and the second analog-digital converter or between the first analog-digital converter and the second control unit or between the first control unit and the second control unit. As a result, parts of a subsystem can be used for the functionality of steering, even if the corresponding subsystem is affected by a failure. The steering system can thus have a redundant design by individual elements of the steering system also being able to communicate with parts of different subsystems.

Disclosed embodiments provide a fault-tolerant steering drive system with high reliability for a steering system with an electromechanical steering drive.

This achieved by the steering drive system for a steering system of a transportation vehicle as claimed in claim 1 as well as by the steering system as claimed in the ancillary claim.

Further configurations are specified in the dependent claims.

All of the further features and effects cited in the claims and the description for the steering drive system also apply in relation to the steering system, the method of operation thereof, and vice versa.

According to a first disclosed embodiment, a steering drive system for a steering system of a transportation vehicle is provided, comprising:

a first control apparatus for controlling a first winding circuit of a steering drive motor with a test circuit, wherein the test circuit is formed to provide a defined, changing, in particular, a periodic test signal;

a second control apparatus for controlling a second winding circuit of the steering drive motor, wherein a test signal receiving circuit of the second control apparatus is formed to receive the test signal, wherein the second control apparatus is formed to control the steering drive motor depending on the test signal.

The second control apparatus can further be formed to control the second winding circuit depending on whether the defined test signal is present or absent.

One idea of the above-mentioned method involves improving an existing steering drive system, which is formed to provide steering assistance and further steering functions, in such a way that the steering drive system can be used for an autonomous driving function. Since an autonomous driving function requires the steering drive system which is being used to have a high degree of reliability, it is therefore necessary to provide a redundancy of components of the steering drive system, so that operation of the steering system is also guaranteed in the event of one of the components of the steering drive system failing.

Moreover, a position sensor can be provided for detecting the rotor position, wherein the first and the second control apparatus are connected to the position sensor to receive position information respectively, wherein the first and the second control apparatus are formed to control the respective winding circuit depending on determined position information by providing a commutation pattern which is dependent on the rotor position. Accordingly, the steering drive is provided as an electronically commutated drive and can be a synchronous machine. To provide a redundancy, the steering drive has electrically separated winding circuits with phase windings which each act on a common rotor which is excited by permanent magnets to drive it. The winding circuits are each controlled by one of the control apparatuses.

As claimed in at least one disclosed embodiment, the position sensor can have a primary circuit, by way of which a magnetic field is imprinted in a soft magnetic element, which is connected to a rotor of the steering drive, by a control signal, and have a secondary circuit which has at least one magnetic field sensor unit, wherein the first control apparatus is formed to provide the control signal for the primary circuit of the position sensor, and wherein the first and the second control apparatus are connected to the at least one magnetic field sensor unit to detect the position information.

Moreover, the test signal can be provided with a frequency and/or phase which corresponds to the frequency or the phase of the control signal for the primary circuit of the position sensor, so that detecting the rotor position in the second control apparatus is carried out based on the frequency or phase of the control signal.

Provision can be made for the first and the second control apparatus to be formed to control the respective winding circuit based on a respective predetermined actuating variable.

During normal operation, the first and second control apparatus work to synchronously control the winding circuits of the steering drive based on an external actuating torque specification (actuating variable) and position information which is provided by the position sensor and which specifies a rotor position of the rotor.

The position sensor is designed to be active and has a primary circuit to couple a defined magnetic field with the soft magnetic element which is attached to the rotor. The coupled magnetic field is detected by magnetic field sensors (GMR sensor, Hall sensor) which are located in a secondary circuit, so that they can detect a position-dependent magnetic field and can provide position information. While only one of the control apparatuses can control the primary circuit, all of the control apparatuses are connected to the secondary circuit, so that the position information for controlling the winding circuits is available to any of the control apparatuses during normal operation.

It is necessary for an error response that the first and the second control apparatus each obtain information regarding whether the respective other control apparatus is working properly. For this purpose, provision is made for the first control apparatus to provide a test signal which is received by the second control apparatus. Only when the first control apparatus is working properly is the test signal generated in the first control apparatus. The test signal is provided in a defined manner and is continually changing, so that the second control apparatus can identify that the first control apparatus is working properly when the test signal is present. If the test signal fails, i.e., it does not change or it is not received or is received in a manner other than the one defined, the second control apparatus thus identifies that an error has occurred in the first control apparatus.

Conversely, the first control apparatus identifies that the second control apparatus is not working properly by checking the plausibility of the actuating torque on the steering drive, which torque is set by the first control apparatus, and the angular velocity measured by the rotor position sensor.

The second control apparatus can have a measuring unit to detect an electric variable with respect to phase conductors of the second winding circuit and to perform a sensorless determination of the rotor position to provide corresponding position information. Sensorless position detection, such as the back-EMF method, for example, are known from the prior art and make it possible to detect a position by evaluating induction voltages in the phase windings. The second control apparatus can therefore determine a rotor position by measuring the voltage of one or a plurality of the phase voltages of the related winding circuit. Owing to the sensorless control, limitations in haptics and performance are to be expected, wherein they are designed in such a way as to be able to guarantee safe function in autonomous driving operation.

If the first control apparatus fails, this is identified by the second control apparatus in that the defined test signal fails to materialize. Since the first control apparatus controls the primary circuit of the position sensor, a first control apparatus which is not working properly should not be expected to be actively operating the primary circuit of the position sensor. After a failure of the first control apparatus is identified by way of the second control apparatus, an operating mode switchover to sensorless detection of a rotor position therefore takes place in the second control apparatus, based on which switchover the steering drive system continues to operate.

In this way, a steering drive system can be realized which has high reliability, wherein, with respect to a conventional steering assistance drive, only little additional effort is necessary for components and functions to achieve a sufficient redundancy.

Moreover, the second control apparatus can be formed to control the second winding circuit based on the position information detected by the position sensor or on the position information established by the sensorless determination of the rotor position, depending on whether the test signal is present or absent.

The test circuit can be formed to provide the test signal if the control signal for the position sensor is provided by the first control apparatus, and not to provide the test signal if the control signal for the position sensor is not provided by the first control apparatus. In this way, the second control apparatus can be provided with information by the test signal, which information specifies if the position information detected via the position sensor is valid.

Moreover, the first control apparatus can be formed to ascertain a malfunction of the second control apparatus by checking the plausibility of the torque, which is predetermined by the corresponding actuating variable, in terms of a pattern of the rotational speed of the steering drive motor. The mutual identification of malfunctions is necessary so that when an error is identified in one of the control apparatuses, the respective other control apparatus can report to an external system, in particular, an autonomous driving function of the transportation vehicle, that the redundancy provided by the second ECU is no longer available. The autonomous driving function is then concluded, or it is prevented from being able to be activated.

According to a further disclosed embodiment, a method for operating the above-mentioned steering drive system is provided, having the following operations:

providing a defined, changing, in particular, periodic test signal by way of the first control apparatus;

receiving the test signal by way of the second control apparatus; and controlling the steering drive motor by way of the second control apparatus depending on the defined test signal.

Figure 1:
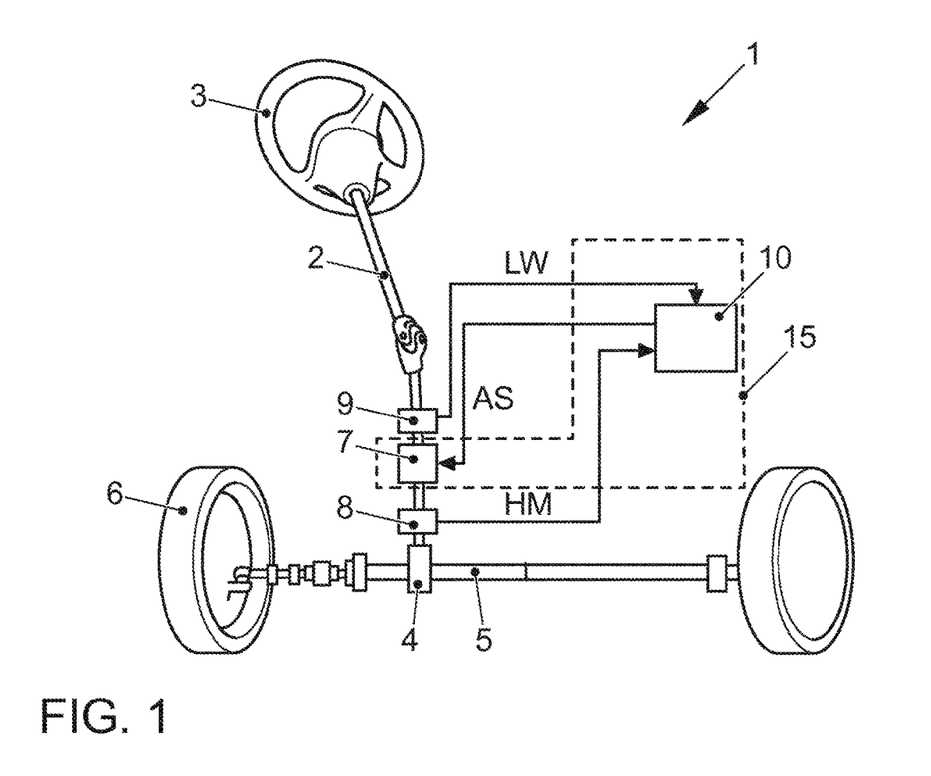
FIG. 1 shows a schematic depiction of a steering system with an electromechanical steering drive system.

FIG. 1 shows a schematic depiction of a steering system 1 of a transportation vehicle. The steering system 1 comprises a steering column 2 which is coupled with a steering wheel 3, so that a steering movement which is exercised on the steering wheel 3 by a driver acts on the steering column 2 as a manual torque. The steering column 2 transmits the manual torque to a pinion 4 which is coupled with a rack 5, so that the rack 5 moves in a linear manner when the steering column 2 is rotated.

The rack 5 is arranged between two steered wheels 6 of the transportation vehicle. The wheels 6 are mounted in such a way that they are pivoted about a pivot axis in the event of a linear movement of the steering rack 5.

Moreover, to provide a steering intervention, the steering column 2 or the rack 5 is coupled with a steering drive 7. The steering intervention can correspond to a steering intervention torque which acts on the steering column 2 or to a steering intervention force on the rack 5. In the present exemplary embodiment shown in FIG. 1, the steering drive 7 acts on the rack 5.

Moreover, a steering control system 10 is provided which is formed to control the steering system 1 and to implement a steering intervention specification LV. By a torque sensor 8 on the steering column 2, a manual torque, which is applied to the steering column 2 via the steering wheel 3, can be established and a corresponding manual torque specification HM can be communicated to the steering control system 10. Correspondingly, the steering column 2 can be equipped with a steering angle sensor 9 which detects a rotation angle of the steering column 2 and provides the steering control system 10 with a corresponding steering angle specification LW. Instead of or in addition to the steering angle sensor 9, a position angle sensor can be provided which establishes a precise rotor position of a steering assistance motor of the steering drive 7.

The steering control system 10 realizes a plurality of steering functions which engage in the steering system 1 and the steering process via controlling the steering drive 7. Steering functions of this type can comprise, inter alia, optimizing feedback from the roadway, compensating for skewed traction, identifying blockage, adapting the steering feel in the case of oversteering/understeering, steering assistance which is dependent on the rack force, assistance force regulation and an optimized, active reserve. Moreover, the steering control system 10 can be formed to receive the steering intervention specification LV, for example, from an autonomous driving function, and correspondingly implement a calculation algorithm in a steering intervention variable AS for controlling the steering drive 7 of the steering system 1.

Figure 2:
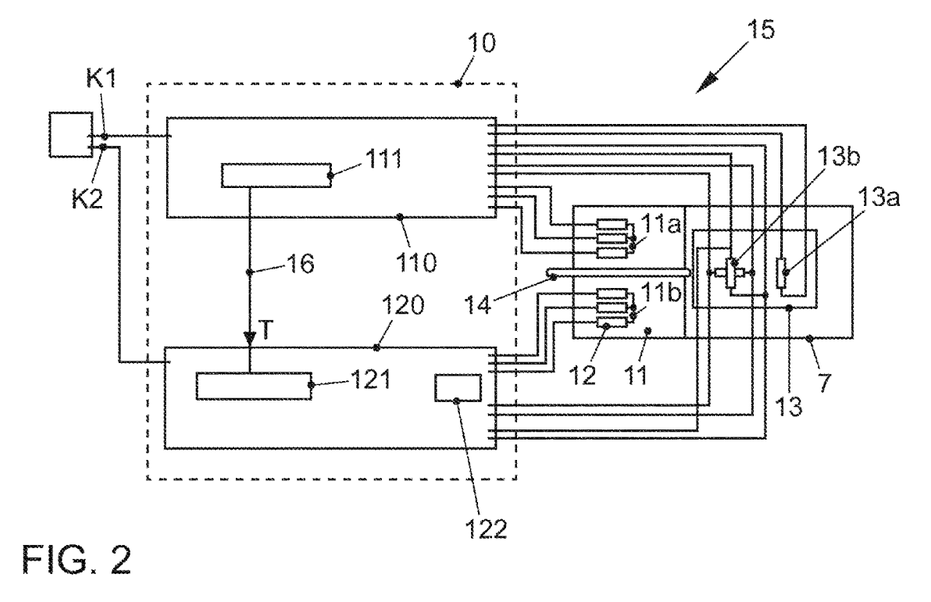
FIG. 2 shows a schematic depiction of an exemplary embodiment of a steering drive system.

The steering drive 7 is formed by the steering drive system 15 from FIG. 2. FIG. 2 shows a detailed schematic depiction of a steering drive system 15 with high reliability. The steering drive system 15 has a steering drive motor 11. The steering drive motor 11 is formed as an electronically commutated electric machine and has two winding circuits 11a, 11b which are supplied with current independently of one another to provide a partial drive torque respectively. The two winding circuits 11a, 11b are arranged in a common stator and act on a common rotor, so that a partial machine is formed respectively by way of the winding circuits 11a, 11b. In the exemplary embodiment shown, each of the winding circuits 11a, 11b has three phases with corresponding phase windings 12 which are supplied with current from the steering control system 10 in a suitable manner by applying phase voltages.

For this purpose, the steering control system 10 comprises a first control apparatus 110 which provides phase voltages in accordance with a commutation diagram for the first winding circuit 11a. The commutation diagram is provided depending on a rotor position detected by sensor. Moreover, the steering control apparatus 10 comprises a second control apparatus 120 which provides phase voltages in accordance with a commutation diagram for the second winding circuit 11b. The commutation diagram can also be provided depending on a rotor position detected by sensor.

The rotor position is determined by a position sensor 13. The position sensor 13 has a primary circuit which comprises a magnetic coil 13a. The magnetic coil 13a is supplied with current by way of a control signal, to imprint a defined sensor magnetic field with a predetermined characteristic in an anisotropically formed soft magnetic element on a rotor shaft 14 of the steering drive motor 11. By a secondary circuit which comprises a magnetic field sensor unit 13b, which are arranged on the rotor shaft 14 in a stationary manner around the soft magnetic element, the spatial orientation of the sensor magnetic field set by the soft magnetic element can now be detected and corresponding measuring signals can be provided. The magnetic field sensor unit 13b can comprise one or a plurality of magnetic field sensors, such as GMR sensors, Hall sensors, and the like, for example. If there is a plurality of magnetic field sensors, they can be rotated against one another to also obtain rotation direction information in addition to the rotor position. The rotor position can be derived in a conventional manner by evaluating the detected measuring signals.

The second control apparatus 120 is also connected to the secondary circuit of the magnetic field sensor unit 13b of the position sensor 13 and performs a corresponding evaluation of the measuring signals of the magnetic field sensor unit 13b, to detect the rotor position. In addition, the second control apparatus 120 has a measuring unit 122, in particular, a voltage measuring unit, to measure phase voltages on the phase conductors of the second winding circuit 11b and to carry out a determination of the rotor position according to a method known per se, without using a position sensor. In addition, current methods evaluate times of zero crossings of induction voltages in the phase conductors, such as in the back-EMF method, for example.

Both control apparatuses 110, 120 are given a first and second actuating variable K1, K2 by an actuating variable block 130, which specifies a partial torque to be provided by the respective partial machine. The respective actuating variable K1, K2 is converted in the control apparatuses 110, 120, in accordance with a commutation diagram, into phase voltages for applying to the phase conductors of the respective winding circuits 11a, 11b, and the partial machines are operated accordingly. The actuating variable block 130 receives an external specification, for example, from an autonomous driving function, and divides the specification into the specifications for the partial torques.

The first and the second control apparatus 110, 120 are connected via a test line 16, via which a test signal T is provided to the second control apparatus 120 by the first control apparatus 110. The test signal T is provided by a test circuit 111 in the first control apparatus 110 in a defined manner and can be a trigger signal, in particular, periodic, which is continually changing at fixed time intervals. The test circuit 111 is formed to check the functionality of the first control apparatus 110 in a suitable manner and in a manner which is known per se by testing one or a plurality of the functions of the control apparatus, and to emit the test signal T as long as it is ascertained that it functions properly.

The second control apparatus 120 has a test signal receiving circuit 121 which is connected to the test line 16 and can receive the test signal T. In this way, the second control apparatus 120 can if the first control apparatus 110 is working properly or not by ascertaining whether the test signal T is present or absent.

The control signal which is generated by the first control apparatus 110 for controlling the primary circuit of the position sensor 13 can be provided as a changing signal with a frequency. To evaluate the measuring signals of the magnetic field sensor unit 13b in the second control apparatus, the test signal T can be modulated in accordance with the frequency of the control signal, so that the measuring signals of the magnetic field sensor unit 13b can be evaluated by the test signal T. The frequency can also be transmitted from the first control apparatus 110 to the second control apparatus 120 in a different manner.

Figure 3:
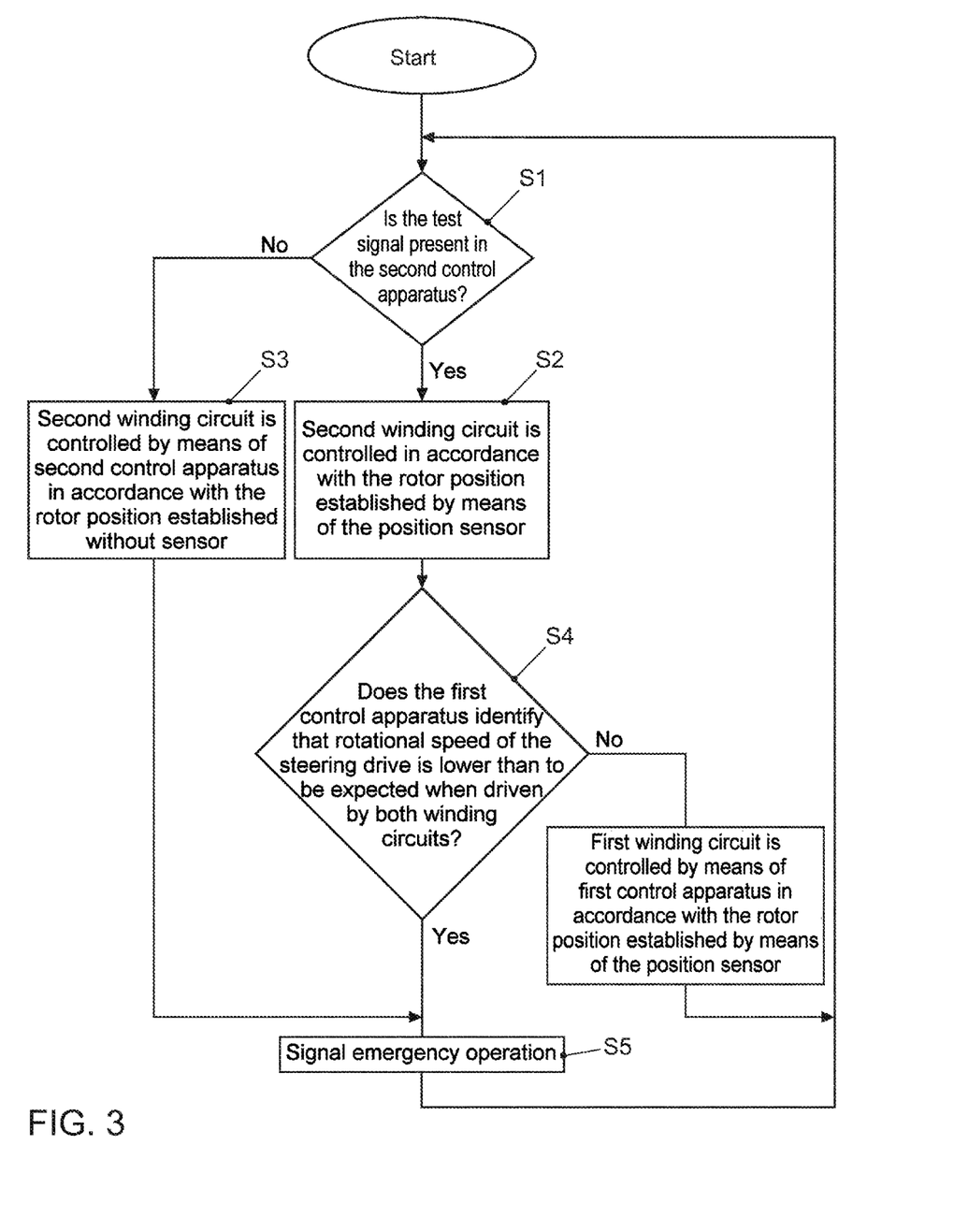
FIG. 3 shows a flow diagram for illustrating a method for operating the steering drive system of FIG. 2.

A method is performed in the control apparatuses 110, 120 to provide reliability, as is explained in greater detail by way of the flow diagram from FIG. 3.

In operation at S1, the second control unit 120 checks if the test signal T is present and corresponds to the desired pattern of the test signal T. If it is ascertained that the test signal T is present (option: yes), the second control unit 120 can assume that the first control apparatus 110 is functioning properly and can therefore rely on the specifications of the measuring signals of the magnetic field sensor unit 13b of the position sensor 13.

Correspondingly, in operation at S2, a commutation of the second winding circuit 11b can take place by way of the second control apparatus 120 for providing the torque required by the first actuating variable K1. For this purpose, the rotor position is established by evaluating the measuring signals from the position sensor 13 and is established for establishing a commutation pattern which is to be currently applied. The method is subsequently continued with operation at S4.

If it is ascertained in operation at S1 that the test signal T is no longer being provided by the first control apparatus 110 (option: no), this indicates a malfunction in the first control apparatus 110. If a malfunction of the first control apparatus 110 is ascertained, an operating mode is switched over in the second control apparatus 120 in operation at S3 and the measuring signals from the position sensor 13 are no longer taken into account. Instead, a sensorless position detection is activated which estimates the rotor position based on phase voltages of the second winding circuit 11b, to thus guarantee proper control in accordance with the commutation diagram by way of the second control apparatus 120. Due to the sensorless operation of the second winding circuit 11b of the steering drive motor 11, limitations in haptics and performance are to be expected, since the sensorless operation can only be carried out in a very imprecise manner, in particular, in the case of low rotational speeds. However, after the error occurs in the first control apparatus 110, the steering system 1 should only be guaranteed to continue to be operated for a short period of time until steering is taken over by the driver or until the transportation vehicle comes to a standstill, so that limitations of the functionality can be taken into consideration. Moreover, the method is continued with operation at S5 and emergency operation is signaled to the autonomous driving function.

In operation at S4, the first control apparatus 110 checks the motor current, applied by the first winding circuit 11a is based on the actuating variable K1, and checks the plausibility thereof using the angular velocity, i.e., deriving the detected rotor positions. If it is ascertained that the steering drive motor 11 does not move within an expected tolerance range of the angular velocity, the first control apparatus 110 can thus ascertain that the second control apparatus 120 is not working properly and does not provide the second partial drive torque. If this is ascertained (option: yes), emergency operation is signaled to the autonomous driving function in operation at S5, which can prompt the driver to take over steering or the transportation vehicle is brought safely to a standstill in the autonomous driving function, for example.

Alternatively (option: no), no error is identified in one of the control apparatuses 110, 120 and, in operation at S6, a commutation of the first winding circuit 11a takes place by way of the first control apparatus 120 for providing the torque required by the first actuating variable K1.

In the event of the second control apparatus 120 failing, provision can be made for the first control apparatus 110 to increase the partial torque, which is to be provided in accordance with the actuating variable K1, of the first partial machine 11a. Analogously, in the event of the first control apparatus 110 failing, provision can be made for the second control apparatus 120 to increase the partial torque, which is to be provided in accordance with the actuating variable K2, of the second partial machine 11b. The increase can take place at short notice, until the autonomous driving function is switched off, i.e., the driver has taken over steering or the transportation vehicle is at a standstill. During this time, a temporary overloading of the first partial machine may be permitted.

The control apparatuses 110, 120 and the winding circuits 11a, 11b of the partial machines are formed in such a way that the torque, which is to be provided by the winding circuits 11a, 11b in accordance with the actuating variables K1, K2, is sufficiently large to maintain an autonomous driving operation for at least a predetermined period of time. The partial drive torques can each correspond to half the total drive torque.

In other configurations, provision can be made for the steering drive system 15 to be formed with more than two control apparatuses to increase the redundancy.

LIST OF REFERENCE SYMBOLS 1 steering system
2 steering column
3 steering wheel
4 pinion
5 rack
6 steered wheels 7 steering drive
8 torque sensor
9 steering angle sensor
10 steering control system
110, 120 control apparatuses
111 test circuit
121 test signal receiving circuit
122 measuring unit
11 steering drive motor
11a, 11b winding circuits
12 phase windings
13 position sensor
13a magnetic coil
13b magnetic field sensor unit
14 rotor shaft
15 steering drive system
16 test line
AS steering intervention variable
LV steering intervention specification
HM manual torque specification

The invention claimed is:

1. A steering drive system for a steering system of a transportation vehicle, the steering drive system comprising:
   a first control apparatus for controlling a first winding circuit of a steering drive motor with a test circuit to provide a defined, changing test signal;
   a second control apparatus for controlling a second winding circuit of the steering drive motor,
   wherein a test signal receiving circuit of the second control apparatus receives the defined, changing test signal, wherein the second control apparatus controls the steering drive motor based on the defined, changing test signal,
   wherein a position sensor detects a rotor position, wherein the first and the second control apparatus are connected to the position sensor to receive position information respectively, wherein the first and the second control apparatus control the respective winding circuit based on determined position information by providing a commutation pattern based on the rotor position, and
   wherein the position sensor has a primary circuit by which a magnetic field is imprinted in a soft magnetic element, connected to a rotor of the steering drive motor by a control signal, and has a secondary circuit which has at least one magnetic field sensor unit, wherein the first control apparatus provides the control signal for the primary circuit of the position sensor, and wherein the first and the second control apparatus are connected to the at least one magnetic field sensor unit to detect the position information.

2. The steering drive system of claim 1, wherein the second control apparatus controls the second winding circuit, based on the presence or absence of the defined, changing test signal.

3. The steering drive system of claim 1, wherein the second control apparatus comprises a measuring unit to detect an electric variable with respect to phase conductors of the second winding circuit and to perform a sensorless determination of the rotor position to provide corresponding position information.

4. The steering drive system of claim 3, wherein the second control apparatus controls the second winding circuit based on the position information detected by the position sensor or on the position information established by the sensorless determination of the rotor position, based on the presence or absence of the defined, changing test signal.

5. The steering drive system of claim 1, wherein the test circuit provides the defined, changing test signal in response to the control signal for the position sensor being provided by the first control apparatus, and does not provide the test signal in response to the control signal for the position sensor not being provided by the first control apparatus.

6. The steering drive system of claim 1, wherein the defined, changing test signal is a periodic test signal that is provided with a frequency and/or phase which corresponds to a frequency or phase of the control signal for the primary circuit of the position sensor, so that detecting the rotor position in the second control apparatus is carried out based on the frequency or phase of the control signal.

7. The steering drive system of claim 1, wherein the first and the second control apparatus control the respective winding circuit based on a respective predetermined actuating variable.

8. The steering drive system of claim 7, wherein the first control apparatus ascertains a malfunction of the second control apparatus by checking the plausibility of the torque, which is predetermined by the corresponding actuating variable, to a pattern of a rotational speed of the steering drive motor.

9. A transportation vehicle including the steering drive system of claim 1.

10. A method for operating a steering drive system of a transportation vehicle, the method comprising:
   providing a defined, changing test signal first control apparatus that controls a first winding circuit of a steering drive motor with a test circuit to provide the defined, changing test signal;
   receiving the test signal at a test signal receiving circuit of a second control apparatus that controls a second winding circuit of the steering drive motor; and
   controlling the steering drive motor by the second control apparatus based on the defined, changing test signal,
   wherein a position sensor detects a rotor position, wherein the first and the second control apparatus are connected to the position sensor to receive position information respectively, wherein the first and the second control apparatus control the respective winding circuit based on determined position information by providing a commutation pattern based on the rotor position,
   wherein the position sensor has a primary circuit by which a magnetic field is imprinted in a soft magnetic element connected to a rotor of the steering drive motor by a control signal, and has a secondary circuit which has at least one magnetic field sensor unit, wherein the first control apparatus provides the control signal for the primary circuit of the position sensor, and wherein the first and the second control apparatus are connected to the at least one magnetic field sensor unit to detect the position information.

11. The method of claim 10, wherein the second control apparatus controls the second winding circuit, based on the presence or absence of the defined, changing test signal.

12. The method of claim 10, wherein the second control apparatus comprises a measuring unit to detect an electric variable with respect to phase conductors of the second winding circuit and to perform a sensorless determination of the rotor position to provide corresponding position information.

13. The method of claim 12, wherein the second control apparatus controls the second winding circuit based on the position information detected by the position sensor or on the position information established by the sensorless determination of the rotor position, based on the presence or absence of the defined, changing test signal.

14. The method of claim 10, wherein the test circuit provides the defined, changing test signal in response to the control signal for the position sensor being provided by the first control apparatus, and does not provide the defined, changing test signal in response to the control signal for the position sensor not being provided by the first control apparatus.

15. The method of claim 10, wherein the defined, changing test signal is a periodic test signal provided with a frequency and/or phase which corresponds to a frequency or phase of the control signal for the primary circuit of the position sensor, so that detecting the rotor position in the second control apparatus is carried out based on the frequency or phase of the control signal.

16. The method of claim 10, wherein the first and the second control apparatus control the respective winding circuit based on a respective predetermined actuating variable.

17. The method of claim 10, wherein the first control apparatus ascertains a malfunction of the second control apparatus by checking the plausibility of the torque, which is predetermined by the corresponding actuating variable, to a pattern of a rotational speed of the steering drive motor.

* * * * *